United States Patent

McLafferty

[15] 3,706,939
[45] Dec. 19, 1972

[54] DIFFRACTION COMPENSATED MIRROR FOR LASER AMPLIFIER

[72] Inventor: George H. McLafferty, Manchester, Conn.

[73] Assignee: United Aircraft Corporation, East Hartford, Conn.

[22] Filed: Feb. 16, 1970

[21] Appl. No.: 11,717

[52] U.S. Cl. .................330/4.3, 331/94.5, 350/204, 350/293
[51] Int. Cl. ...........................................H01s 3/05
[58] Field of Search....330/4.3; 331/94.5; 350/160 R, 350/171, 204, 293

[56] References Cited

UNITED STATES PATENTS 3,433,556   3/1969   Giesecke .......................350/204

3,365,671   1/1960   Kogelnik ........................330/4.3

OTHER PUBLICATIONS

A. I. ialkovskii, "Open Resonators Formed by Flat Reflectors with Impedance Discontinuity at the Edges" 12/66, Pg. 807–812, Soviet Physics.
Pittsburgh Plate Glass Co., "Various Edge Finishes" 1946, Section F-.8 & F-.3.

Primary Examiner—Samuel Feinberg
Assistant Examiner—N. Moskowitz
Attorney—Melvin Pearson Williams

[57] ABSTRACT

Mirrors used in multi-pass laser amplifiers are compensated for diffraction of electromagnetic radiation, caused by abrupt surface transitions at the mirror edges, by rounding of the mirror edges.

2 Claims, 2 Drawing Figures

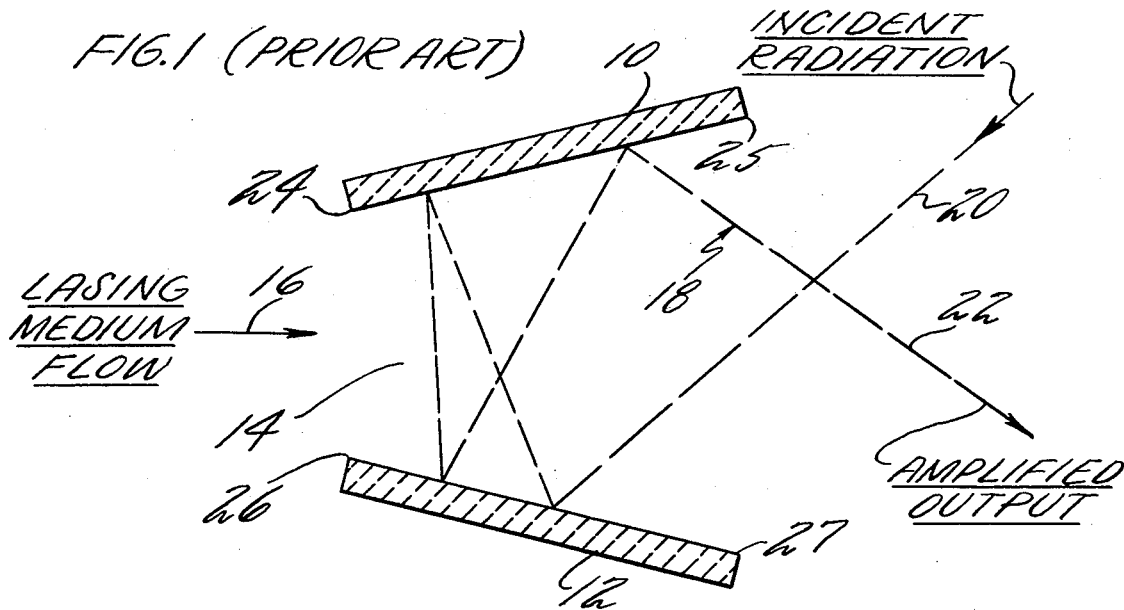
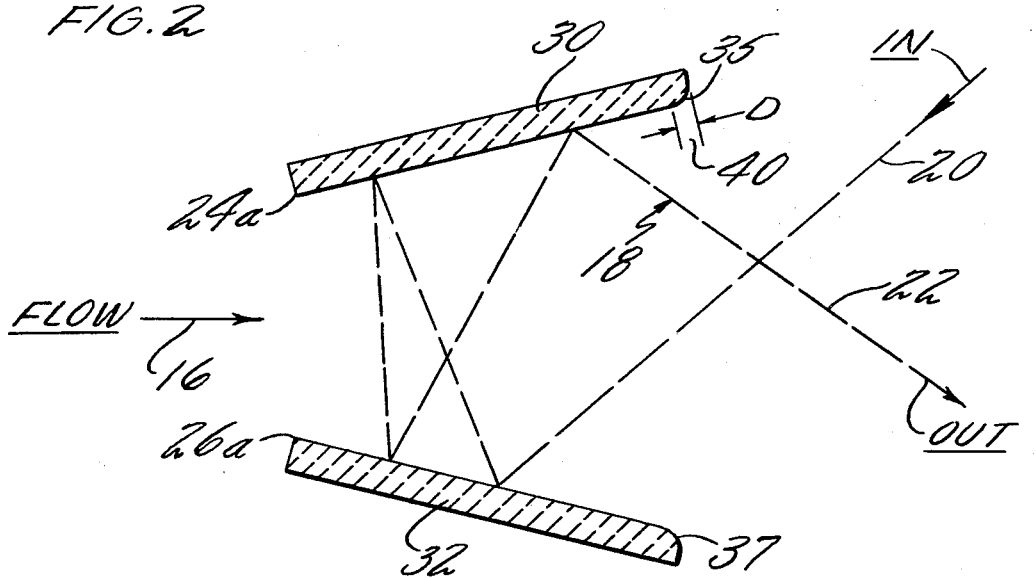

DIFFRACTION COMPENSATED MIRROR FOR LASER AMPLIFIER

BACKGROUND OF THE INVENTION

1. Field of Invention

This invention relates to lasers, and more particularly to an improved mirror for laser amplifiers.

2. Description of the Prior Art

Recent growth in laser technology has made possible production of coherent electromagnetic radiation in the visible and near visible spectrum, herein referred to as laser light. An illustrative type of laser is the well known carbon-dioxide gas laser whereby the carbon dioxide gas is caused to achieve a population inversion of an upper laser energy state relative to the population of a lower laser energy state; the resulting non-equilibrium energy distribution promotes the emission of quanta of electromagnetic radiation (such as laser light) from a molecule in such a state, the molecule thereby assuming the lower laser energy state. The quantum of laser light generated or emitted (referred to as a photon) as a result of this energy state transition is equivalent to the amount of energy differential between the two energy states; further, the energy carried by a single quantum or photon is related to the wavelength of the photon by the well known relationship $E = h(c/\lambda)$ where $E$ = the energy carried by the photon
$h$ = Planck's constant, and
$\lambda$ = the wavelength of the photon.

The phenomenon described has been found to be advantageously exploitable in carbon dioxide gas; additionally, lasers in which the gas is flowing have been found to be capable of very high laser light output intensity, high gain, and high efficiency.

To benefit fully from the high laser power capability of modern lasers, such as a flowing carbon dioxide gas laser, a suitable laser configuration must be provided. For instance, an oscillator configuration, which initiates the generation of laser light output from a suitably excited lasing medium (such as carbon dioxide) requires the presence of a very high flux intensity within the laser cavity in which oscillations occur. In order to sustain oscillation, this flux intensity must be much greater than the intensity of useful laser light output which may be extracted from the cavity during continuous wave operation. For example, use of an oscillator to generate one hundred watts of laser light may require an internal flux within the oscillator comparable to as much as ten thousand watts. Additionally, because of the requisites of the oscillator, characteristics of mirrors which may form a part of the oscillator cavity render it extremely difficult to extract large amounts of power from a cavity. For instance, removal of energy by hole coupling tends to distort the output beam as a result of diffraction effects; the resulting perturbation of the oscillator modes causes power concentration on the mirror which can result in excessive heating and destruction of the mirror. Alternatively, the use of partially transmitting mirrors, although valuable at low power levels, results in sufficient absorption of energy so as to overheat and damage the partially transmitting mirrors and to substantially reduce the efficiency of power extraction. Therefore, it is preferred to use amplifier configurations when the extraction of laser energy from an excited optical gain medium is desired at very high power levels.

A known laser amplifier configuration which is very advantageous insofar as the physics of laser power extraction are concerned, includes a pair of planar mirrors oriented at a slight angle to one another with an optical gain medium disposed therebetween. This permits an incident beam of electromagnetic radiation to enter and exit the gain medium at an angle to the mirrors, thereby avoiding the necessity of having the beam pass through the mirrors. Similarly, a variety of path geometries may be provided in such amplifiers, including delta multi-pass path configurations. This type of amplifier permits increasing the intensity of a relatively low-intensity beam of incident radiation in successive passes between the amplifier mirrors utilizing the high saturation intensity of the laser gain medium and thereby extracting a maximum amount of power from the laser gain medium. Additionally, since the spurious radiations can result in a beam of substantial intensity at other than the intended path within the amplifier, significant damage to the internal surfaces of the apparatus can result therefrom.

However, it has heretofore been difficult, if not impossible, to achieve ideal operation of multi-pass amplifiers of the type described without incurring internal damage in the lasing apparatus. A paramount problem in such amplifiers, sometimes referred to as "self lasing," results from the generation of random, spurious unwanted laser beams, sometimes of a very small magnitude, within the active region of the amplifier. This results in depleting the population of the upper energy state of the lasing medium and in a corresponding reinforcement in intensity of the spurious beam. In a gas laser gain medium, such spurious beams result in a larger population of the lasing medium molecules in lower energy states, which states promote the absorption of the laser light energy from the desired output beam. Thus, the maximum power output obtainable, the gain and the efficiency of the amplifier may be seriously depleted as a result of spurious radiation created within the amplifier region. One source of spurious radiation of the type described is the diffraction of the electromagnetic radiation which can occur at sharp edges or discontinuities in the surface of the mirrors. For instance, if the edges of the mirrors are sharp, the diffraction of either the main beam of the radiation which may partially spill over to the edges, or the diffraction of other spurious signals, can result in constructive interference, further resulting in unwanted radiation of substantial magnitude.

SUMMARY OF THE INVENTION

An object of the present invention is to provide an improved mirror for a laser amplifier.

According to the present invention, the exposed edges of a reflecting surface of a laser amplifier mirror are rounded over the surface beginning at a distance in excess of ten times the wavelength of the laser light from the mirror edge and terminating at the mirror edge.

The present invention substantially reduces spurious radiation within the amplifier region of a laser amplifier and it reduces the damage caused by spurious laser beams internal to the amplifier apparatus. The invention promotes efficient operation of high power, multi-pass laser amplifiers.

The foregoing and other objects, features and advantages of the present invention will become more apparent in the light of the following detailed description of a preferred embodiment thereof, as illustrated in the accompanying drawing.

BRIEF DESCRIPTION OF THE DRAWING

FIG. 1 is a simplified, sectioned plan view of a multi-pass laser amplifier in accordance with the prior art; and FIG. 2 is a simplified, sectioned plan view of one embodiment of a multi-pass laser amplifier in accordance with the present invention.

DESCRIPTION OF THE PREFERRED EMBODIMENT

A typical multi-pass amplifier of the type known to the art is illustrated in FIG. 1. Therein, a pair of mirrors 10, 12 are disposed in close proximity about a region 14 in which a laser gain medium is present. The laser gain medium may comprise a suitable gas, such as carbon dioxide, flowing between the mirrors 10, 12 through the region 14, as illustrated in FIG. 1 by an arrow 16. In FIG. 1, the path of amplification is indicated by the dashed line 18, and includes a beam of incident radiation 20 and an amplified output beam 22. As viewed in FIG. 1, the surface of each of the mirrors 10, 12 is seen to include a pair of discontinuities, such as the corners 24–27 thereof, respectively. As is known in the art, sharp discontinuities in the surface upon which electromagnetic radiation is incident may result in diffraction, which in turn can result in both destructive and constructive interference of various waves generated as a result of this phenomenon. The result is as if a plurality of sources of electromagnetic radiation having various directions of propagation is created at the discontinuity. The present invention is directed to the elimination of spurious beams being diffracted from sharp mirror edges.

Referring to FIG. 2, a preferred embodiment of the present invention comprises a multi-pass laser amplifier including a pair of mirrors 30, 32, including the improvement of the present invention which comprises the provision of rounded corners 35, 37. The mirrors are rounded from the edges back along the reflecting surfaces by a distance 40 indicated in FIG. 2 as D. In accordance with the invention, it has been found that spurious generation of electromagnetic radiation is substantially reduced in a laser amplifier of the type described when the distance D is equal to or greater than ten times the wavelength of the laser radiation being extracted from the lasing medium within the amplifier.

The edges 35, 37 specially prepared in accordance with the present invention minimize the origination of spurious radiation as a result of diffraction at sharp edges, prevent the constructive interference of radiation from spurious sources, and avoid build up of substantial beams of radiation from unwanted sources. The mirror edges 24a and 26a may remain sharp (as in the prior art).

The embodiment of the invention illustrated in FIG. 2 and described herein is simplified, being shown in schematic form, since the remaining structure of the amplifier forms no part of the present invention. It suffices that the mirrors 30, 32 be receptive to incident radiation and capable of providing amplified output radiation, and a suitable laser gain medium be contained in the region 14 therebetween. Thus, although described herein with respect to a flowing carbon dioxide gas laser, any other suitable lasing medium disposed between the mirrors 30, 32 is suitable in a laser amplifier employing the present invention. Additionally, although the invention has been shown and described with respect to but one preferred embodiment thereof, it should be obvious to those skilled in the art that the foregoing and various other changes and omissions in the form and detail thereof may be made therein without departing from the spirit and the scope of the invention.

Having thus described a typical embodiment of my invention, that which I claim as new and desire to secure by Letters Patent of the United States is:

1. In a laser amplifier having a pair of substantially planar reflection surfaces divergingly disposed on opposite sides of a laser gain region to redirect laser radiation through said region, the improvement comprising:
one edge of each mirror being rounded along the plane of the reflection surface of the mirror a distance D equal to at least ten times the wavelength of the radiation whereby spurious radiation as a result of diffraction at the rounded edge is reduced, said rounded edge being at the most divergent end of each mirror and the distance D being so limited in length that the reflection characteristics of the mirror are essentially those of a planar mirror as opposed to those of a curved or nonplanar mirror.

2. A laser amplifier comprising:
a pair of mirrors, each having a substantially planar reflecting surface, said mirrors forming surfaces to reflect the electromagnetic radiation in the amplifier, said mirrors adapted to be disposed in proximity to one another with a laser gain medium disposed therebetween, said mirrors being disposed relative to one another so that the major plane of one of said substantially planar reflecting surfaces is at a slight angle to the major plane to the other of said substantially planar reflecting surfaces, whereby said surfaces diverge toward one end of the amplifier region, each of said planar reflecting surfaces terminating in a round surface which extends along the related major plane a distance which is substantially equal to and not less than ten times the wavelength of the radiation therein, at the ends of said surfaces near the divergent end of said amplifier whereby spurious radiation as a result of diffraction at the rounded edges is reduced.

* * * * *